C. W. NEWELL.
WEB GAGE AND DETECTOR.
APPLICATION FILED JULY 28, 1914.
1,219,345.
Patented Mar. 13, 1917.
2 SHEETS—SHEET 1.
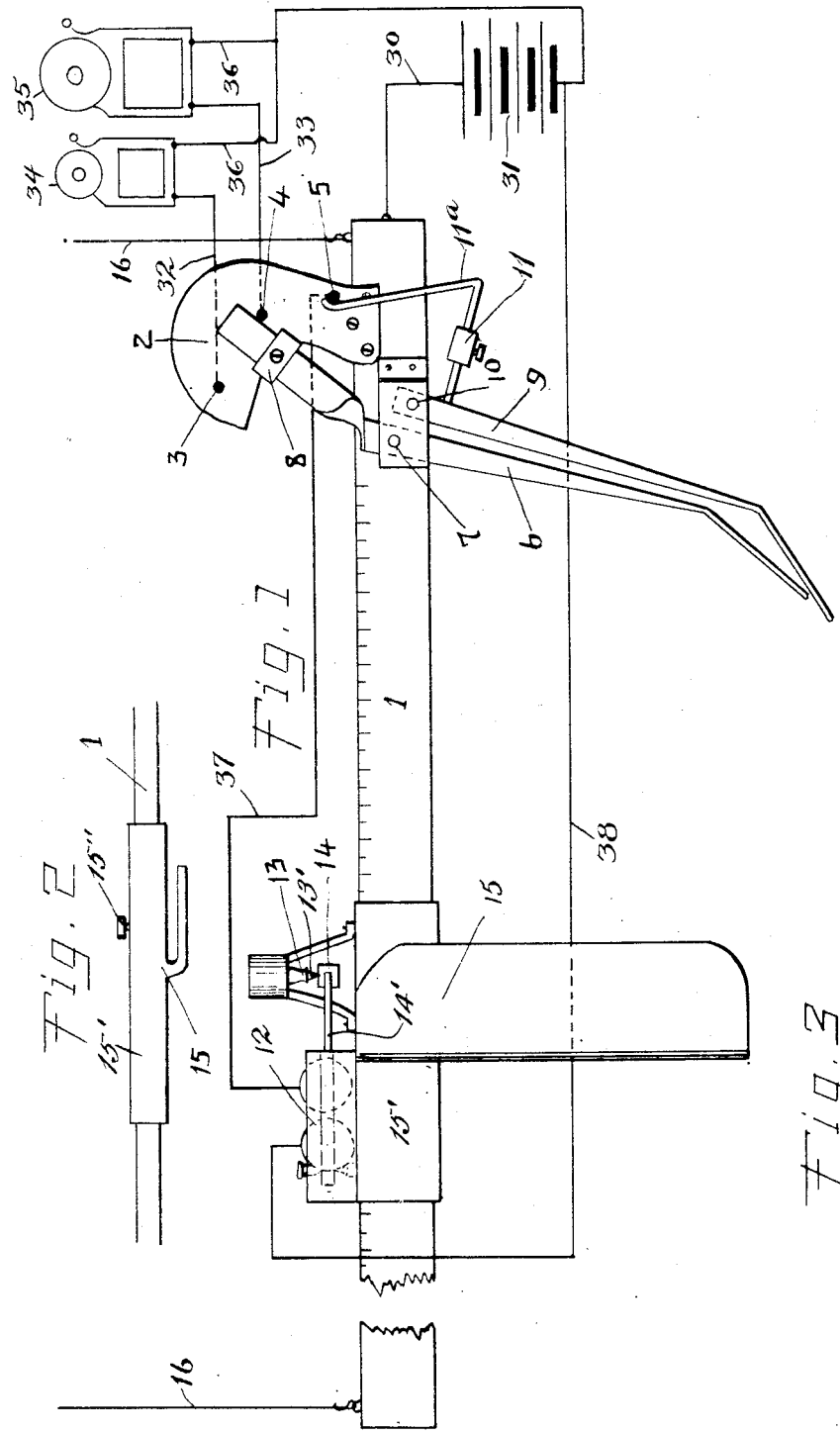
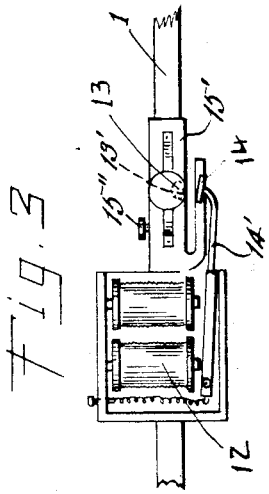
WITNESSES:
Lawrence Phillips
INVENTOR
Clinton William Newell

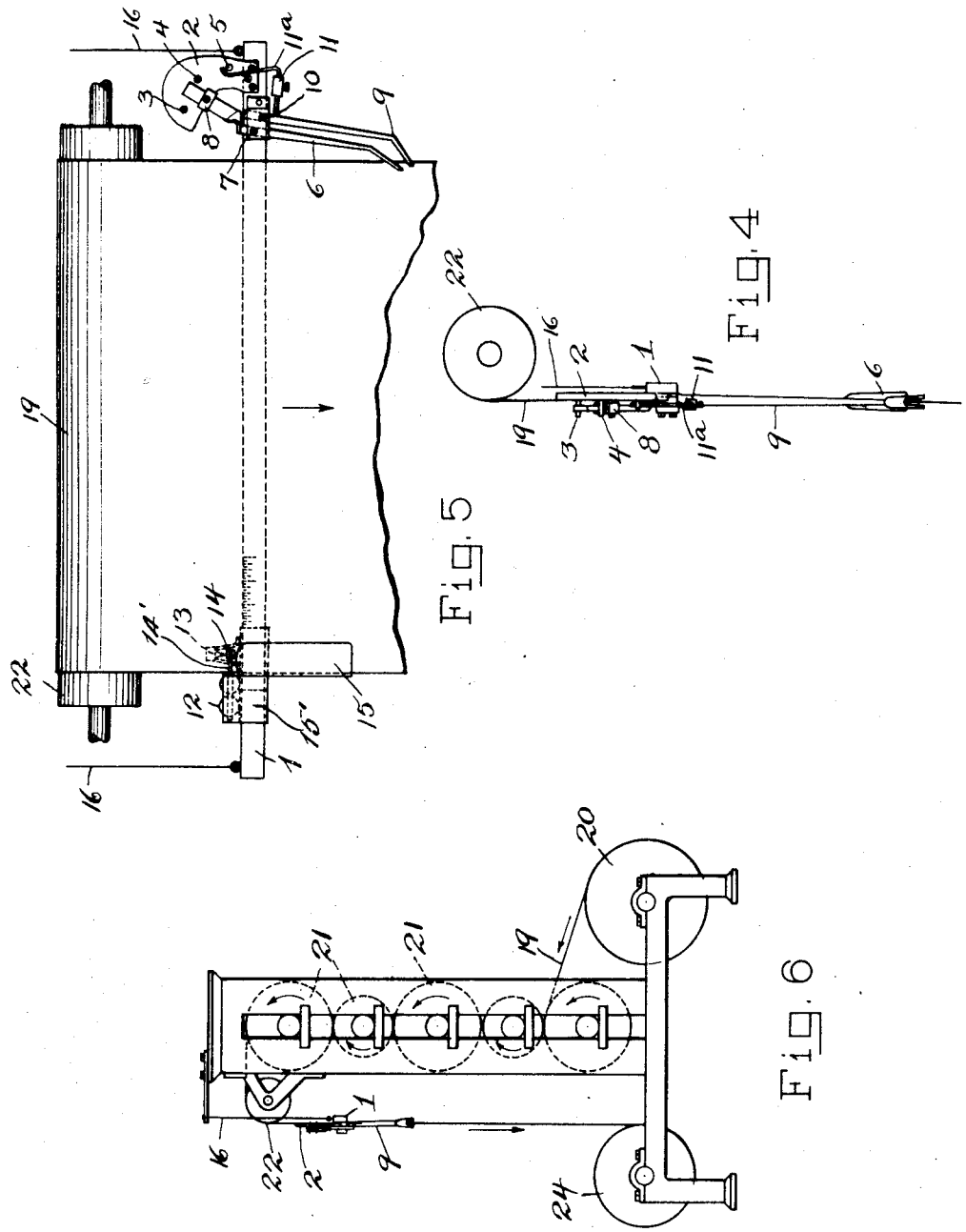

UNITED STATES PATENT OFFICE.

CLINTON WILLIAM NEWELL, OF PORTLAND, OREGON.

WEB GAGE AND DETECTOR.

1,219,345.      Specification of Letters Patent.      Patented Mar. 13, 1917.

Application filed July 28, 1914. Serial No. 853,626.

*To all whom it may concern:*

Be it known that I, CLINTON WILLIAM NEWELL, a citizen of the United States, and a resident of Portland, in the county of Multnomah and State of Oregon, have invented a certain new and useful Improvement in Web Gages and Detectors, of which the following is a specification.

My invention relates more particularly to an instrument by means of which the width of web, either bagging, cloth, paper or other material may be gaged or regulated as it comes from the calender, mangle or finishing machine.

My present invention comprises an instrument so arranged and so electrically connected with convenient electric alarms as to warn the operator should the web be finishing too wide or too narrow, the instrument being so sustained as to swing with or follow the web freely in its lateral movements.

The instrument may be connected with an electro-magnet so as to draw a plate, roller or other suitable part against a fixed fountain pen or other marking device, marking the margin of the web in case of its being finished too narrow for the purposes required.

The invention is embodied in the instrument illustrated by the accompanying drawings in which Figure 1 is a side elevation of the instrument showing the wiring of the gongs and marking device in diagram, Fig. 2 is a plan view of the guide to guide the web; Fig. 3 is a plan view of the electromagnet and marking device in combination with guide shown in Fig. 2; Fig. 4 is a view of the instrument at that end on the right of the instrument as shown in Fig. 1; Fig. 5 shows the instrument in its operating position in relation to the web; and Fig. 6 indicates an example of a five roll calender or finishing machine with the instrument in operating position in relation to said machine.

In the arrangement shown the bar or frame 1 of the instrument is composed of aluminum or other suitable material and is of a length sufficient to accommodate web of the extreme width capable of being finished by the calender or finishing machine; it is a conductor of electricity and is connected by a wire 30 with an electric battery or other source of current 31. The bar or frame 1 is sustained by wires 16 16 or other flexible means to allow the instrument to swing with or follow the web freely in its lateral movements. Attached firmly to one end of the bar or frame 1 is a bracket 2. This bracket 2 is a non-conductor composed of wood fiber or other suitable material and carries electric contact points 3 and 4 connected respectively by wires 32 and 33 with gongs 34 and 35, each of said gongs having a different tone. Wiring 36 leads from the two gongs back to the source 31.

A lever 6, composed of aluminum or other suitable material capable of conducting electricity, is supported by and connected by the pivot pin 7, with the bar or frame 1. The lower end of said lever 6 is forked as shown in Fig. 4 and is designed to engage and rest against the edge of the web, while the upper end is between the two contact points 3 and 4. The upper end of lever 6 is furnished with a weight and set screw 8 by which the lever may be delicately adjusted.

In operation the web 19 passes from the roll of unfinished web 20 (Fig. 6); thence through the rollers 21 of the calender, passing over the roller 22, thence through the instrument to the roll of finished web 24. The direction of the movement of the web is indicated by the arrows shown in Figs. 5 and 6. The instrument being light swings with and readily follows the lateral movements of the web as it passes over the roller 22.

When the web is too narrow, the lever 6 makes contact with contact point 4, thus completing the circuit of the gong 35 which rings and warns the operator.

When the web is too wide, the lever 6 makes contact with contact point 3 and completes the circuit of the gong 34 thereby sounding the latter.

Another lever 9 is supported by and connected, by means of the pivot pin 10, with the bar or frame 1. The lower end of lever 9 is forked and engages and rests against the edge of the web, while the upper end or arm is so arranged and balanced, by means of the weight and set-screw 11 on angular arm 11ª that should the web run excessively narrow, contact will be made with the contact point 5 which is connected by wire 37 with the electro-magnet 12. Another wire 38 leads from this magnet to the source 31. On contact being made the circuit will be closed and the electro-magnet 12 and marking device 13 will be put in operation, the plate 14 being drawn by the magnet against the web, pressing the web against the pen 13' or other ink or color supply. Plate 14 is carried by an armature 14' which is attracted by a magnet 12. The markings so made will indicate at a glance such portions of the web as may be too narrow for the purposes required.

No contact can be made with contact point 5 until after contact has been made with contact point 4.

The movable U-shaped guide 15 is to guide the web and is attached to the bar or frame 1 by means of a slide 15' on said bar or frame so as to slide along the bar, said slide having a set screw 15'' whereby it may be fastened at any point to accommodate different widths of web, the guide being adjusted to the desired width of the web. To aid such adjustment a measuring scale may be used on the bar or frame 1.

In adjusting the instrument, one edge of the web is engaged in the forks of the levers 6 and 9 respectively, the other edge being engaged in the U in the guide 15 shown in Fig. 2, the edge of the web touching the bottom of said U. By sliding the part 15 along the frame or bar 1, the instrument may be adjusted to the desired width of web and part 15 fixed securely in such position. When so adjusted, the pressure of the web, when of the desired width, against the lower part of the lever 6 will cause the upper part of the lever 6 to assume a position midway between contact points 3 and 4 and, the same pressure being exercised against the lower part of lever 9, contact is avoided with contact point 5.

Particular emphasis is laid upon the mounting of the bar or frame member 1 since by this mounting said bar or member is permitted to move freely with the web as the latter ripples in its travel, a considerable amount of this rippling taking place as the web is wound from one roller onto another.

Now, having described my invention, what I claim and desire to secure by Letters Patent is:—

1. A width variation detecting instrument for use in connection with traveling webs comprising a member to engage the edge of the web and be moved by inaccuracies thereof, and means for marking the web at the inferior points when said member encounters inaccuracies in said edge.

2. A width variation detecting instrument for use in connection with traveling webs comprising a member to engage the edge of the web and be moved by inaccuracies thereof, and means for giving warning in case said member moves excessively inward or excessively outward due to inaccuracies in said edge of the web.

3. A width variation detecting instrument for use in connection with traveling webs comprising a support, a member mounted pivotally thereon and movable in opposite directions, said member being adapted to engage the edge of the web, and means for giving warning in case said member moves excessively in either direction due to inaccuracies in said edge of the web.

4. A width variation detecting instrument for use in connection with traveling webs comprising a member to engage the edge of the web and be moved by inaccuracies thereof, an electrically operated device for marking the web, and means for completing the circuit of said device when said member moves excessively.

5. A width variation detecting instrument for use in connection with traveling webs comprising a member to engage the edge of the web and be moved by inaccuracies thereof, said member being movable in opposite directions and having a metallic portion, a pair of contacts between which said metallic portion normally moves idly, said portion being adapted to strike one contact or the other to complete an electric circuit in case the aforesaid member is moved excessively in one direction or the other by inaccuracies in the edge of the web.

6. A width variation detecting instrument for use in connection with traveling webs comprising a substantially balanced lever one end of which is adapted to engage the edge of the web and be moved by inaccuracies thereof, said lever having a metallic portion, and a pair of relatively fixed contacts between which said portion normally moves idly, said portion being adapted to engage one or the other of said contacts to complete an electric circuit when the lever moves excessively in either direction, due to inaccuracies in said edge of the web.

7. An instrument for automatically detecting variations in the width of a traveling web, and means for sustaining said instrument to allow it to move freely with the web as said web ripples during its travel.

8. An instrument for automatically detecting variations in the width of a traveling web including a frame member on which the detecting means is mounted and means for mounting said frame to allow it to move freely with the web as said web ripples during its travel.

9. An instrument for automatically detecting variations in the width of a traveling web including a frame member, and means for suspending such frame member to move freely with the web as said web ripples during its travel.

10. An instrument for detecting variations in the width of a traveling web including an elongated frame member to extend transversely of the web, a support above said frame member, suspending members to the lower ends of which the ends of said frame member are secured, said suspending members depending from said support, and means carried by said frame member for detecting variations in the width of the web.

11. An instrument for detecting variations in the width of a traveling web comprising an elongated frame member to extend transversely of the web, a relatively fixed guide on said frame member to receive one edge of the web, and a movable detecting member likewise carried by said frame member to engage the opposite edge of said web and be moved in the plane of said web by inaccuracies thereof.

12. An instrument for detecting variations in the width of a traveling web comprising a member to engage the edge of the web and be moved by inaccuracies thereof, means for giving warning in case said member moves excessively due to inaccuracies in the edge of the web, a second member adapted to engage the edge of the web and to move beyond the aforesaid member in case a portion of said web is excessively narrow, a marking device adjacent the web, and means operable by the movement of said second member for operating said marking device.

13. An instrument for detecting variations in the width of a traveling web comprising a substantially balanced lever one of whose ends is adapted to engage the edge of the web and be moved by inaccuracies thereof, a pair of contacts between which said lever normally travels idly, said contacts being adapted to be engaged by said lever to complete an electric circuit and give warning when said lever moves excessively in either direction, a second substantially balanced lever also having an end adapted to engage the edge of the web and capable of moving beyond the web engaging end of the first named lever in case the web runs excessively narrow, an electrically operated marking device adjacent the web, and an additional contact against which a portion of the second lever is adapted to bear to operate said marking device, when said second lever moves beyond the other lever.

In testimony whereof I have hereunto subscribed my name in the presence of two witnesses.

CLINTON WILLIAM NEWELL.

Witnesses:
    LAWRENCE C. PHILLIPS,
    L. D. BOSLEY.